United States Patent

Furuichi et al.

Patent Number: 5,814,725
Date of Patent: Sep. 29, 1998

[54] TIRE PRESSURE DETECTING APPARATUS AND MONITORING APPARATUS

[75] Inventors: Kenji Furuichi, Tokyo; Moritaka Goto, Chiba; Masaaki Yamamoto, Kamagaya; Saiichiro Ohshita; Kazutoshi Fukada, both of Ota, all of Japan

[73] Assignee: Fujikura Ltd., Tokyo, Japan

[21] Appl. No.: 910,785

[22] Filed: Aug. 13, 1997

Related U.S. Application Data

[63] Continuation of Ser. No. 598,231, Feb. 7, 1996, abandoned.

[30] Foreign Application Priority Data

Feb. 8, 1995 [JP] Japan ................................ 7-020832
Feb. 8, 1995 [JP] Japan ................................ 7-020833

[51] Int. Cl.$^6$ .................................................. B60C 23/02
[52] U.S. Cl. ................................................... 73/146.5
[58] Field of Search ............................. 73/146.3, 146.4, 73/146.5, 715, 745; 200/61.25; 338/32 H; 340/442, 445, 448

[56] References Cited

U.S. PATENT DOCUMENTS

| | | | |
|---|---|---|---|
| 3,828,309 | 8/1974 | Yamasaki et al. | 340/58 |
| 4,177,671 | 12/1979 | Ichihara et al. | 73/146.5 |
| 4,208,649 | 6/1980 | Sarides | 73/146.5 |
| 4,238,955 | 12/1980 | Reinecke | 73/146.5 |
| 4,866,982 | 9/1989 | Gault | 73/146.5 |
| 4,953,394 | 9/1990 | Franke et al. | 73/146.5 |
| 5,542,293 | 8/1996 | Tsuda et al. | 73/146.5 |

FOREIGN PATENT DOCUMENTS

| | | |
|---|---|---|
| 0000818 | 2/1979 | European Pat. Off. . |
| 4425398 | 7/1994 | Germany . |
| 58-160833 | 9/1983 | Japan . |
| 03090407 | 4/1991 | Japan . |
| 07323708 | 12/1995 | Japan . |
| 07323709 | 12/1995 | Japan . |
| 07329523 | 12/1995 | Japan . |
| 07329524 | 12/1995 | Japan . |
| 07329525 | 12/1995 | Japan . |
| 09/325881 | 12/1993 | WIPO . |

OTHER PUBLICATIONS

Uemura, Y, et al., Tire Pressure Warning System, Report on the Tenth International Technical Conference on Experimental Safety Vehicles, Jul. 1–4, 1985.

Primary Examiner—William L. Oen
Attorney, Agent, or Firm—John P. White; Cooper & Dunham LLP

[57] ABSTRACT

A tire pressure detector of an automobile, comprises a magnet having N and S poles and rotated in accordance with a pneumatic pressure in a tire, the N and S poles being rotatable in reverse, detecting means, arranged opposite to the magnet, for detecting magnetism and outputting a voltage signal changed to different magnetism level in accordance with rotation of the magnet, and determining means for comparing the voltage signal with a positive or negative threshold value and determining whether the pneumatic pressure in the tire is within a suitable range, based on a polarity of the voltage signal represented by a comparison result.

4 Claims, 11 Drawing Sheets

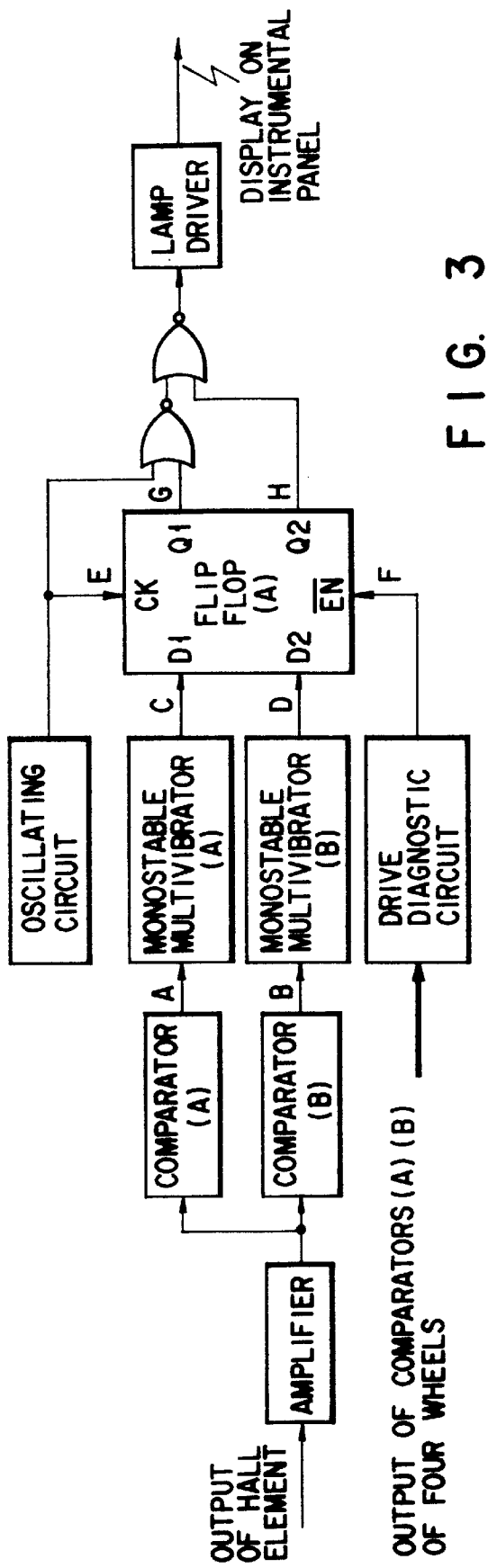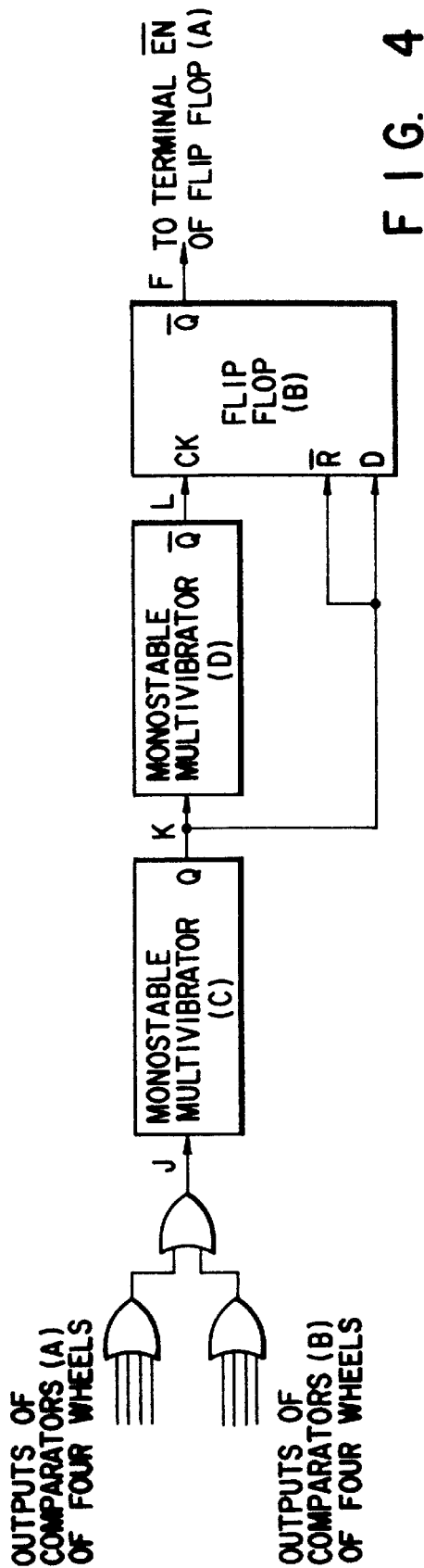
FIG. 3
FIG. 4

| | 1.7 ATMOSPHERE | ≈ 1.85 ATMOSPHERE | 2.0 ATMOSPHERE | MALFUNCTION |
|---|---|---|---|---|
| COMPARATOR A | H | H | L | L |
| COMPARATOR B | L | H | H | L |

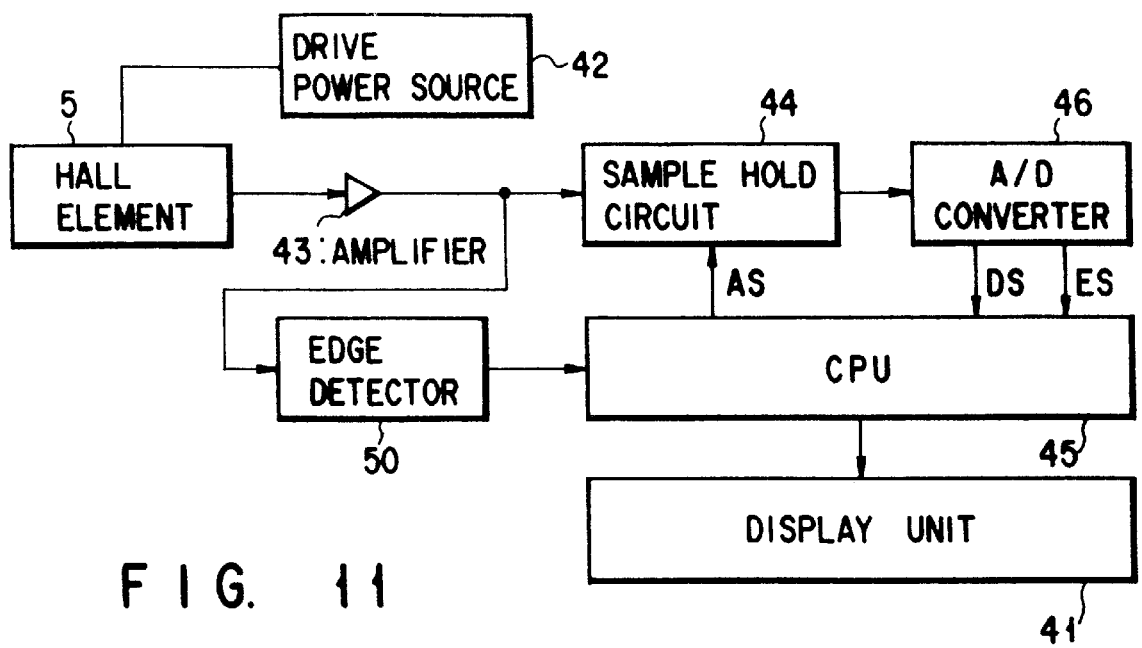
F I G. 11
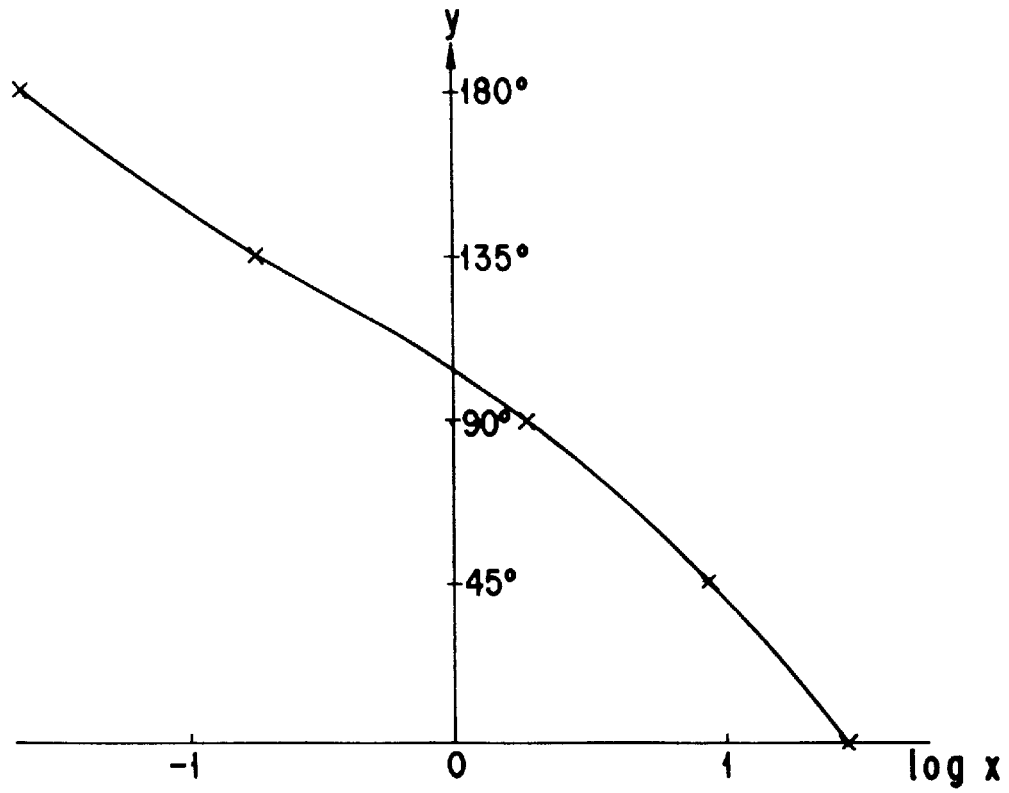
F I G. 13

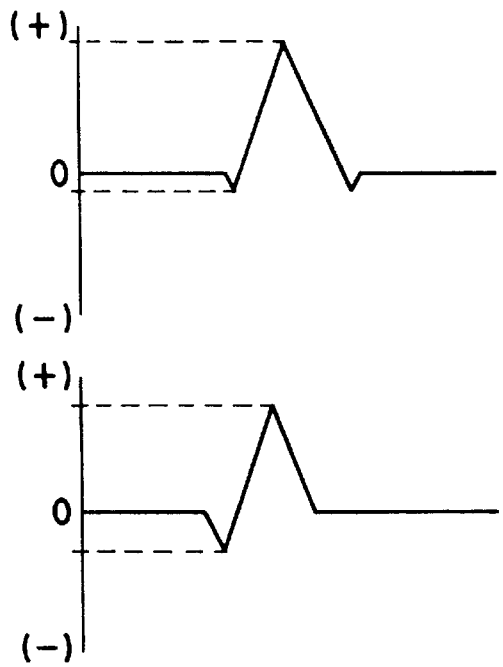
F I G. 12A
F I G. 12B
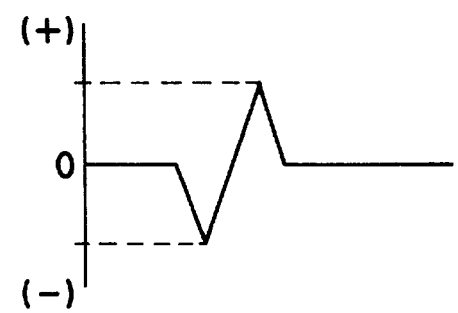
F I G. 12C
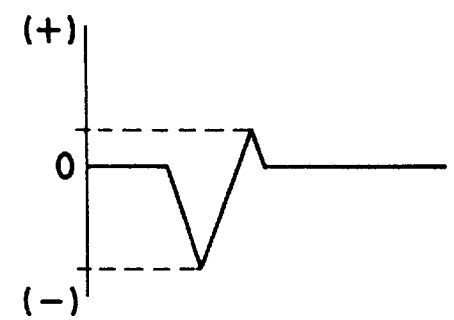
F I G. 12D
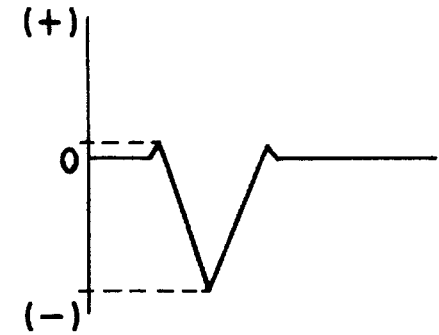
F I G. 12E

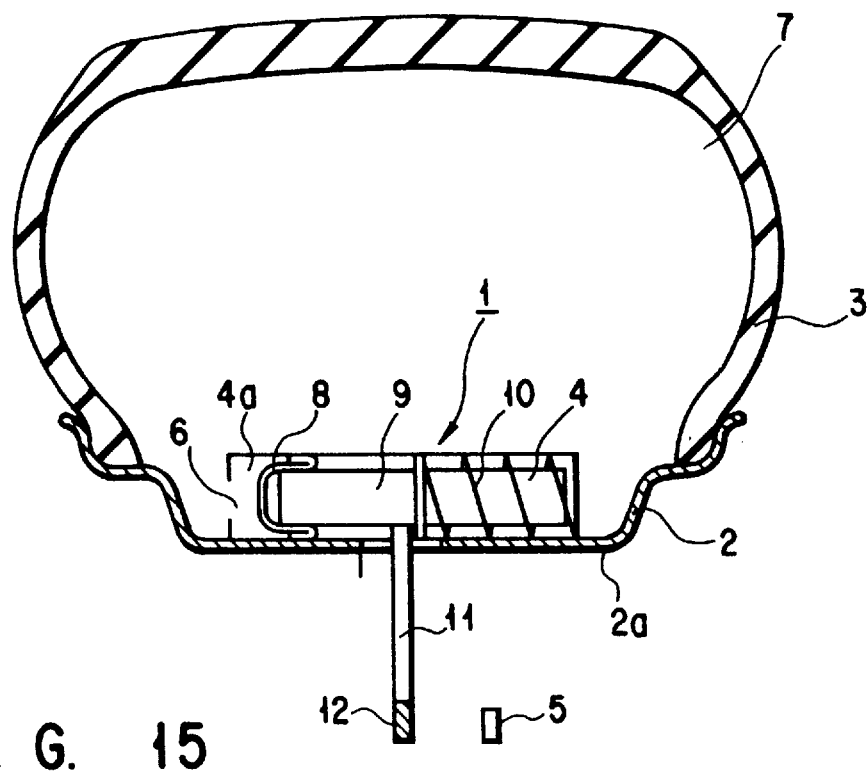
F I G. 15
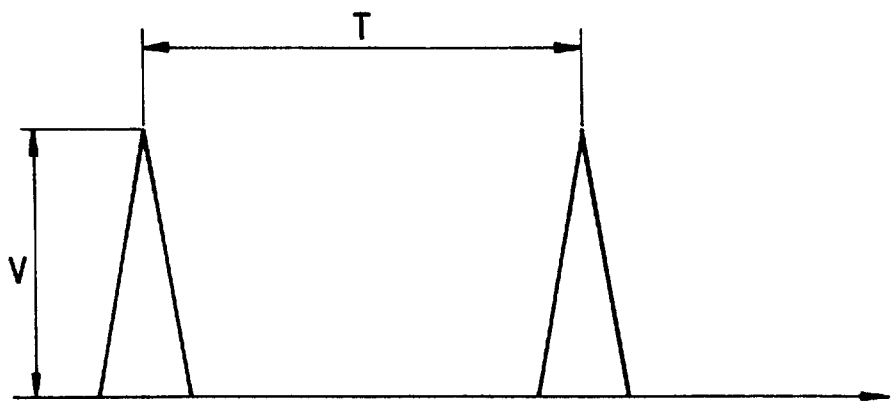
F I G. 16

TIRE PRESSURE DETECTING APPARATUS AND MONITORING APPARATUS

This application is a continuation of U.S. Ser. No. 08/598,231, filed Feb. 7, 1996 now abandoned.

BACKGROUND OF THE INVENTION

1. Field of the Invention

The present invention relates to a tire pressure detector adapted for detecting and monitoring pneumatic pressure in a tire attached to the body of an automobile or the like.

2. Description of the Related Art

In a conventional tire pressure detector attached to, for example, an automobile, a pressure sensor is mounted for each wheel and pneumatic pressure in the tire is directly detected by the sensor. A transmitter for transmitting an output of the pressure sensor is mounted on the side of a rotating tire, while the body has an antenna or the like for receiving a signal from the transmitter, so as to perform signal transmission therebetween. However, since the tire pressure detector of this type requires a transmitter and an antenna for transmitting and receiving signals, it has a complicated structure and the manufacturing cost is high. In addition, since an independent power source is required for a tire, it is difficult to detect exhaustion of a battery or to exchange the battery.

To solve these problems, in recent years, a tire pressure detector of an improved type has been proposed, which has a sensor unit integrated with the tire, and a tire pressure detector mounted on the body. The sensor unit on the tire side has a magnet or the like which moves in accordance with the pneumatic pressure in the tire. The tire pressure detector has a detector unit for detecting movement of the magnet.

FIG. 15 shows an example of the tire pressure detector of this type. FIG. 15 is a cross-sectional view showing the conventional tire pressure detector. A tire pressure detector 1 has a sensor unit 4, mounted on the outer peripheral surface of a rim portion 2a of a wheel 2, for detecting the pneumatic pressure in a tire 3 attached to the wheel 2. The tire pressure detector 1 also has a Hall element (detector) 5, fixed to the body side, for detecting a change in the sensor unit 4 and a monitoring circuit (not shown) for monitoring a detected value output from the Hall element 5. A communicating hole 6 is formed in the sensor unit 4. An inner portion 4a within the hole 6 communicates with an air chamber defined by the wheel 2 and the tire 3. The sensor unit 4 includes a rubber diaphragm 8 to which inner pressure of the tire is applied, a movable element 9 which can reciprocate along the axial direction of the sensor unit 4, a spring 10 for pushing the movable element 9 toward the air chamber 7, and a magnet 12 attached to the movable element 9 via an arm 11 projecting inward from the inner surface of the rim portion 2a of the wheel 2.

In the tire pressure detector 1 having the above structure, the diaphragm 8 is deformed along the axis of the sensor unit 4 in accordance with the pneumatic pressure in the tire 3. Accordingly, the magnet 12 is moved together with the movable element 12 along the axis of the sensor unit 4. Thus, as the distance between the magnet 12 and the Hall element 5 is changed, the intensity of the magnetic field of the magnet 12, detected by the Hall effect of the Hall element 5, is changed. When the value detected by the Hall element 5 is out of a preset range, the monitoring circuit determines that the pneumatic pressure in the tire 3 is abnormal.

In the conventional tire pressure detector 1 as described above, there is a problem that, if the distance between the magnet 12 and the Hall element 5 is not accurately set, a predetermined output cannot be obtained from the Hall element and the monitoring circuit may receive an erroneous result, e.g., an under pressure.

Further, assuming that the temperature of an area around the tire 3 ranges from −40° C. to 125° C., the output of the Hall element will considerably vary particularly at a relatively low temperature. Therefore, some temperature compensation is required, resulting in a complex circuit structure and a high manufacturing cost. Moreover, since the magnet 12 is exposed to the surrounding atmosphere, the magnetic force of the magnet may vary due to iron powder, in which case an accurate tire pressure cannot be detected.

The Hall element 5 outputs a pulse signal as shown in FIG. 16, each time the tire 3 makes one rotation. In FIG. 16, a symbol T denotes a period determined by the rotation rate of the tire 3 and a symbol V denotes a peak value corresponding to the tire pressure. Thus, in the conventional tire pressure detector, it is necessary to compare the peak value V of the pulse signal with a preset reference voltage, in accordance with the rotation rate of the tire 3. If the comparison is performed at an inaccurate timing, the monitoring circuit will always receive an erroneous result of an under pressure.

Furthermore, whenever the peak value V of the pulse signal is smaller than the preset reference voltage, the conventional tire pressure detector 1 determines that the pressure is insufficient. Therefore, even if a pulse signal is not obtained due to a malfunction of the detector, the detector may determine that the pressure is insufficient. Thus, the conventional detector has a drawback that a low pressure state is not distinguishable from a malfunction of the detector. In addition, the conventional tire pressure detector cannot detect tire pressure with high precision and reliability.

SUMMARY OF THE INVENTION

An object of the present invention is to provide a tire pressure detector which can detect whether the pneumatic pressure in a tire is within a suitable range with high precision and reliability, without an influence of a change in temperature or the like, and which can also detect a malfunction of the detector.

Another object of the present invention is to provide a tire pressure detector, which can detect a pneumatic pressure in a tire without an influence of environmental conditions, such as a positional deviation due to low accuracy of attaching the sensor unit or the Hall element, so that the tire pressure can be detected accurately and reliably.

To achieve the above objects, there is provided a tire pressure detector of an automobile, comprising: a magnet having N and S poles and rotated in accordance with a pneumatic pressure in a tire, the N and S poles being rotatable in reverse; detecting means, arranged opposite to the magnet, for detecting magnetism and outputting a voltage signal changed to different magnetism level in accordance with rotation of the magnet; and determining means for comparing the voltage signal with a positive or negative threshold value and determining whether the pneumatic pressure in the tire is within a suitable range, based on a polarity of the voltage signal represented by a comparison result.

BRIEF DESCRIPTION OF THE DRAWINGS

FIG. 3 is a block diagram showing a monitoring circuit of a first embodiment;

FIG. 4 is a block diagram showing a drive diagnostic circuit;

FIG. 11 is a block diagram of a monitoring circuit of a second embodiment;

FIGS. 12A to 12E are diagrams showing waveforms of outputs from a Hall element corresponding angles of a rotating magnet;

FIG. 13 is a graph for explaining the operation of the present invention;

FIG. 15 is a cross-sectional view showing a conventional tire pressure detector; and FIG. 16 is a diagram showing a waveform of an output of a Hall element of the conventional tire pressure detector.

DETAILED DESCRIPTION OF THE PREFERRED EMBODIMENTS

Figure 1:
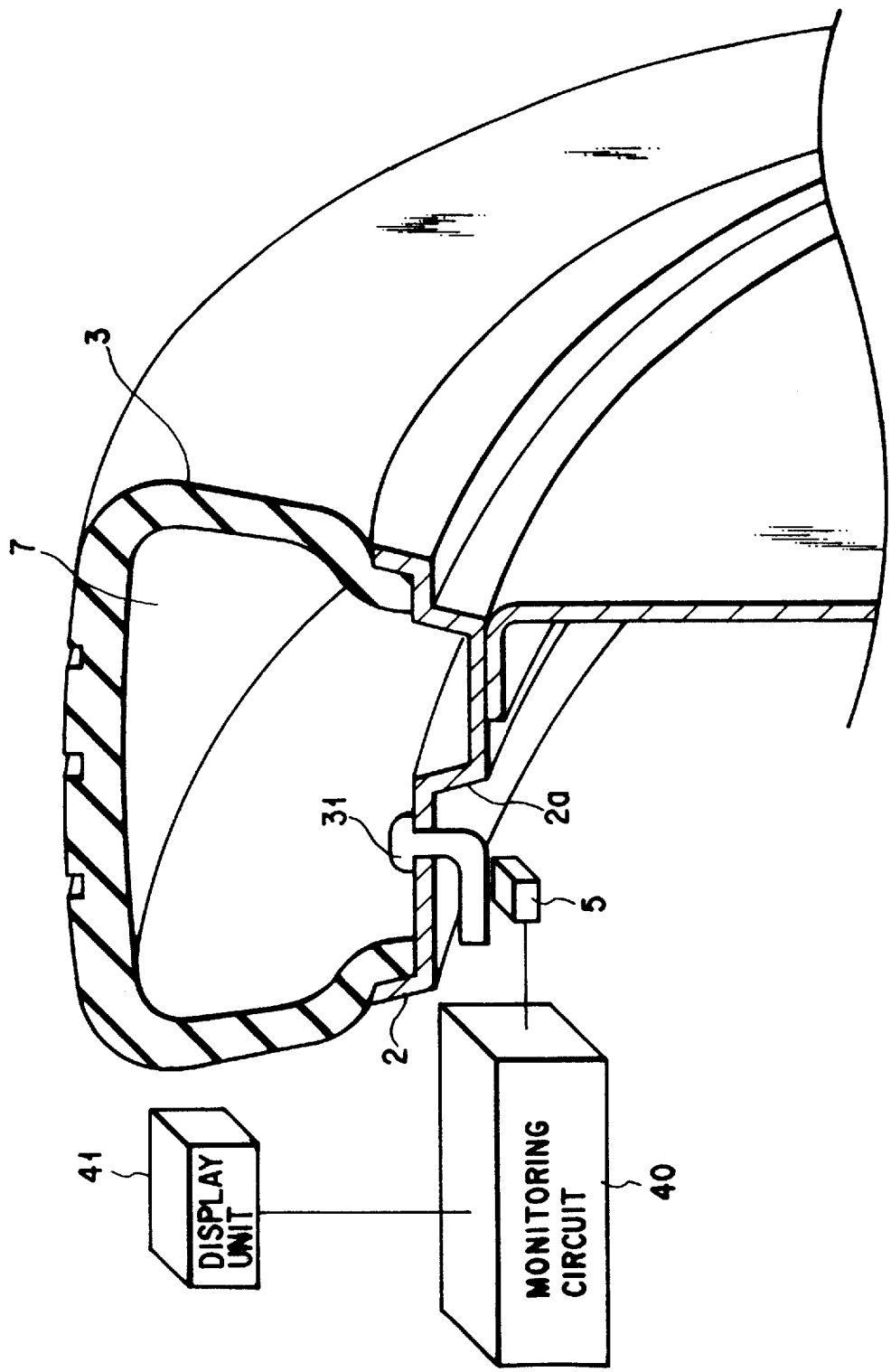
FIG. 1 is a schematic diagram for explaining a tire pressure detector of the present invention.

A first embodiment of the present invention will be described with reference to FIG. 1. As shown in FIG. 1, an L-shaped pressure detector 31 is incorporated with a rim portion 2a of a wheel 2 to detect pneumatic pressure in a tire 3 attached to the wheel 2. Details of the structure of the pressure detector 31 will be described later with reference to FIG. 2.

A Hall element 5 for detecting magnetism from the pressure detector 31 is arranged near one end of the pressure detector 31.

A signal detected by the Hall element 5 is output to a monitoring circuit 40. A display unit 41 is connected to the monitoring circuit 40. The display unit 41 displays a pressure in the tire 3.

Details of the pressure detector 31 will now be described with reference to FIG. 2.

Figure 2:
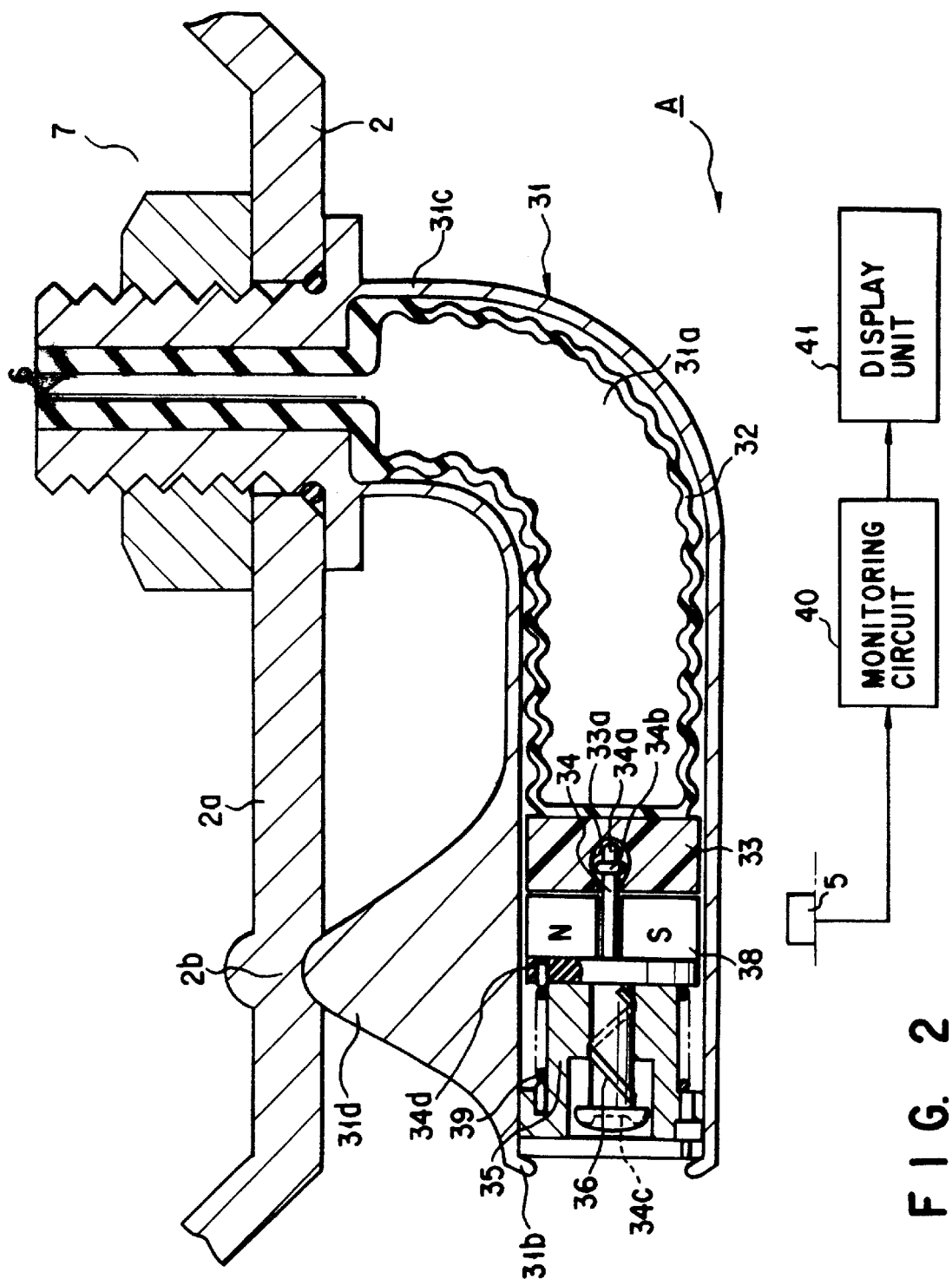
FIG. 2 is a cross-sectional view showing the tire pressure detector.

In FIG. 2, a through hole 6 is formed in a sensor unit (the pressure detector) 31 of a tire pressure detector A. An inner space 31a of the sensor unit 31 communicates with an air chamber 7 defined by the wheel 2 and the tire (not shown). The sensor unit 31 includes a diaphragm 32 made of rubber or the like and a piston (movable element) 33, which is attached to a distal end portion of the diaphragm 32 and capable of reciprocating along the axis of the sensor unit 31. The piston 33 is formed of, for example, a lubricant resin. With the above structure, the diaphragm 32 is deformed in accordance with the pneumatic pressure in the tire (not shown) and accordingly, the piston 33 is reciprocated.

A rotary shaft 34, extending along the axis of the sensor unit 31, is arranged in a distal end portion 31b of the sensor unit 31. One end 34a of the rotary shaft 34 is rounded so that it can be brought into contact with the piston 33 at a point. An edge portion 34b is formed on the end 34a of the rotary shaft 34 and rotatably supported in a recess portion 33a of the piston 33. With this structure, the rotary shaft 34 is capable of reciprocating together with the piston 33, while it is rotating. The other end 34c of the rotary shaft 34 is caulked so that the rotary shaft 34 may not be removed from a support 35 formed integral with the sensor unit 31. A threaded portion 36, to be engaged with the support 35, is formed on the side of the other end 34c with a lead of an amount of, for example, 6 mm.

An annular magnet 38 is fixed by adhesive or the like to an edge portion 34d on a surface perpendicular to the axis of the rotary shaft 34. The upper portion of the magnet is the N pole and the lower portion thereof is the S pole. The rotary shaft 34 is capable of reciprocating in the axial direction with 3 mm stroke.

The ends of a twisted coil spring (biasing member) 39 are fixed respectively to the edge portion 34d of the rotary shaft 34 and the support 35, so that the rotary shaft 34 is biased to be rotated in the axial direction. The twisted coil spring 39 has been compressed to a degree and twisted in the rotary direction of the rotary shaft 34 in advance, so as to rotate the rotary shaft 34 in a direction in which it is moved to a proximal end 31c of the sensor unit 31, when the pressure applied to the diaphragm 32 becomes a preset value.

The sensor unit is prevented from rotating by means of a projection 31d and a recess portion 26 of a rim portion 2b, and fixed to a predetermined position.

In the tire pressure detector A, when the pneumatic pressure in the tire (not shown) is within a preset suitable range (e.g., in the case of an automobile, 2.0 kg/cm$^2$), the Hall element 5 detects the S pole of the magnet 38, as shown in FIG. 2.

When the pneumatic pressure in the tire (not shown) is reduced under the lower limit (to e.g., 1.7 kg/cm$^2$) due to a puncture or the like, the diaphragm 32 is biased by the twisted coil spring 39 and deformed toward the proximal end 31c. Accordingly, the piston 33 is moved backward to the side of the proximal end 31c. The rotary shaft 34, the end 34a of which is in contact with the piston 33, is rotated around the axis, so as to be moved backward 3 mm to the proximal end 31c by means of the threaded portion 36 engaged with the support 35. At this time, since the lead of the threaded portion 36 formed in the rotary shaft 34 is 6 mm, the rotary shaft 34 is rotated 180° around the axis. As a result, the polarities (the N pole and the S pole) of the magnet 38 attached to the rotary shaft 34 are inverted. The Hall element 5 detects the N pole of the magnet 38.

The monitoring circuit will now be described with reference to FIGS. 3 and 4. FIG. 3 is a block diagram showing a structure of the monitoring circuit, and FIG. 4 is a block diagram showing a structure of a drive diagnostic circuit included in the monitoring circuit.

A monitoring circuit 40 will now be described. Referring to FIG. 3, an amplifier amplifies an output voltage from the Hall element 5 to a predetermined level, since the voltage is in the order of millivolt. The amplified voltage is output to two comparators A and B.

The comparator A compares the voltage output from the Hall element 5 with a predetermined positive voltage. If the output voltage from the Hall element 5 is higher than the predetermined voltage, the comparator outputs a signal of High level. On the other hand, if the output voltage from the Hall element 5 is lower, the comparator outputs a signal of Low level. The comparator B compared the voltage output from the Hall element 5 with a predetermined negative voltage. If the output voltage from the Hall element 5 is lower than the predetermined voltage (i.e., if the absolute value of the output voltage from the Hall element 5 is greater), the comparator outputs a signal of High level. On the other hand, if the output voltage from the Hall element 5 is lower (i.e., if the absolute value of the output voltage from the Hall element is smaller), the comparator outputs a signal of Low level.

Figure 5:
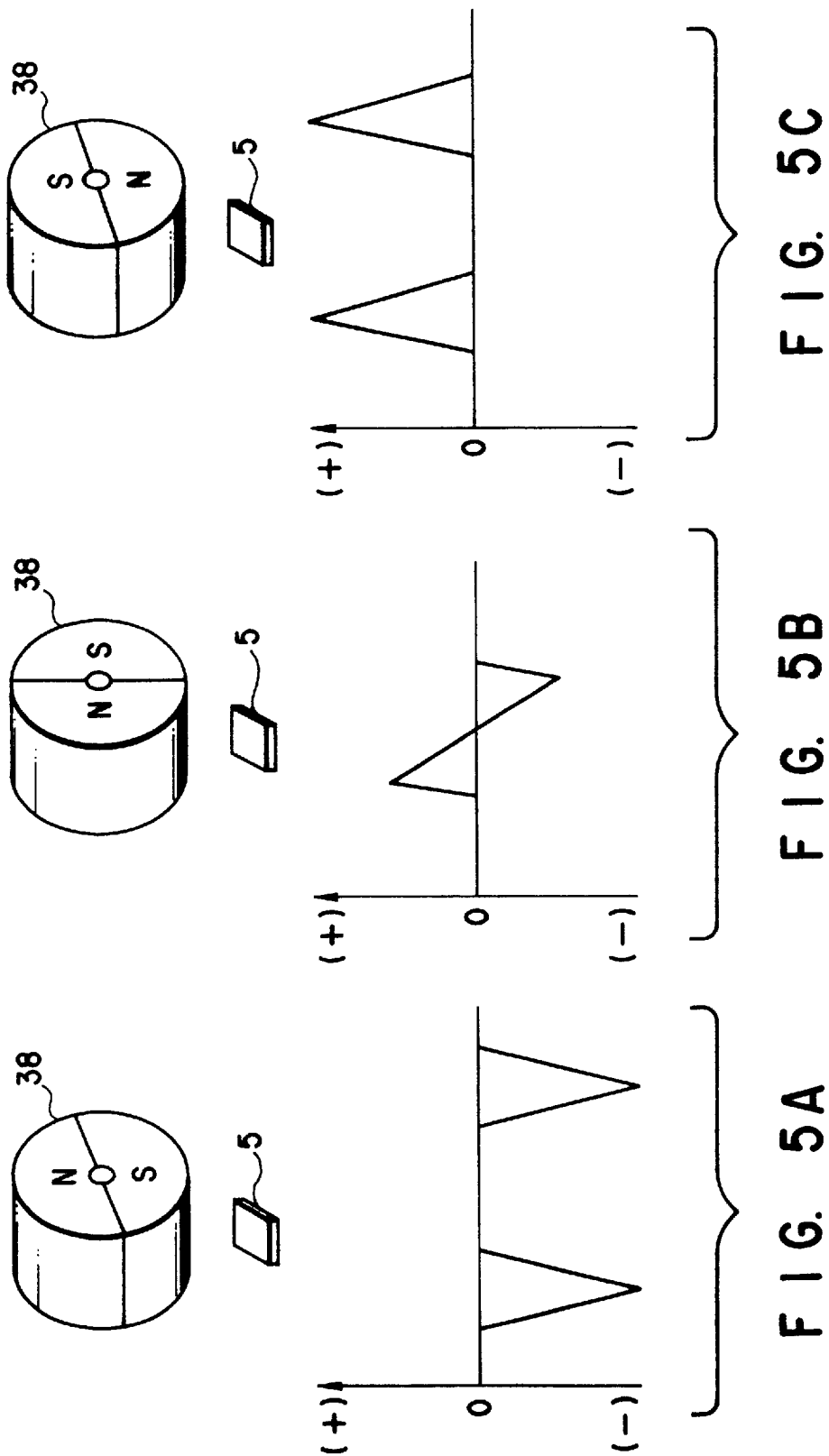
FIGS. 5A to 5C are diagrams showing the relationship between the direction of a magnet and the corresponding output voltage from a Hall element, when the tire pressure is within a suitable range.

The relationship between the rotation of the magnet 38 and the output voltage from the Hall element 5 will be described with reference to FIG. 5. As described before, the rotary shaft 34 is 180° rotated around the axis in accordance with the pneumatic pressure of the tire, thereby reversing the magnet 38 attached to the rotary shaft 34. FIG. 5 (a) shows the direction of the magnet 38 and the output voltage from the Hall element 5, in a case where the pneumatic pressure in the tire is 2.0 Kg/cm$^2$. In this case, the S pole of the magnet 38 faces the Hall element 5 and the Hall element 5 outputs a lowest negative voltage.

FIG. 5 (b) shows the direction of the magnet 38 and the output voltage from the Hall element 5, in a case where the pneumatic pressure in the tire is reduced to, for example, 1.85 Kg/cm$^2$. In this case, the magnet 38 is rotated such that the boundary between the N pole and the S pole faces the Hall element 5. The Hall element 5 outputs positive and negative voltages of a relatively low level.

FIG. 5 (c) shows the direction of the magnet 38 and the output voltage from the Hall element 5, in a case where the pneumatic pressure in the tire is further reduced to, for example, 1.7 Kg/cm$^2$ (below the suitable range). In this case, the N pole of the magnet 38 faces the Hall element 5 and the Hall element 5 outputs a highest positive voltage.

Figures 6, 7:
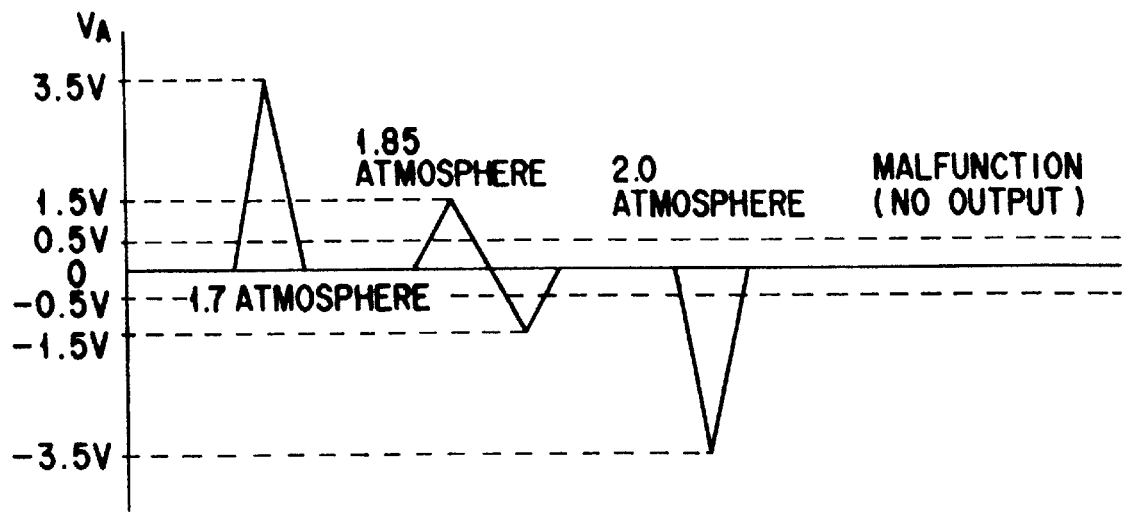
FIG. 6 is a diagram for explaining operations of comparators A and B.
FIG. 7 is a truth table showing outputs of comparators A and B.

In this embodiment, as shown in FIG. 6, if peak values of the voltages output from the Hall element 5 (amplified by the amplifier) corresponding to the pneumatic pressures in the tire 1.7 Kg/cm$^2$, 1.85 Kg/cm$^2$ and 2.0 Kg/cm$^2$ are +3.5 V, ±1.5 V and −3.5 V, respectively, the threshold voltages of the comparators A and B are set to +0.5 V and −0.5 V, respectively.

The results of the comparison by the comparators A and B are shown in FIG. 7. When the pneumatic pressure in the tire is 1.7 Kg/cm$^2$, the output of the comparator A is High and the output of the comparator B is Low. When the pneumatic pressure in the tire is 1.85 Kg/cm$^2$, the outputs of both the comparators A and B are High.

When the pneumatic pressure in the tire is 2.0 Kg/cm$^2$, the output of the comparator A is Low and the output of the comparator B is High. When the tire pressure detector A malfunctions due to some reason and no voltage is output from the Hall element 5, the outputs of both the comparators A and B are Low. Thus, it is possible to discriminate between the state in which the pneumatic pressure in the tire is below the suitable range (i.e., 1.7 Kg/cm$^2$ or lower) and the outputs of the comparators A and B are respectively High and Low and the state in which the pneumatic pressure in the tire cannot be detected due to a malfunction of the detector A.

Referring to FIG. 3, output pulses of the comparators A and B are respectively input to retriggerable monostable multivibrators A and B. Outputs of the monostable multivibrators A and B are triggered for a predetermined period of time T (second) by rise of input pulses. In this embodiment, the time T is set as follows:

T =2.4 second (pulse interval corresponding to 3 km/h).

The monitoring circuit includes a flip-flop A to maintain data, which has been obtained during a drive, even when the automobile is stationary and no output pulse is obtained. The flip-flop A, using an output of an oscillating circuit as a clock, fetches data when the clock rises. In the other cases, it maintains the fetched data.

The flip-flop A has an enable terminal ($\overline{EN}$). When the enable terminal $\overline{EN}$ receives a Low enable signal, the flip-flop A fetches data in the aforementioned manner. When the enable terminal $\overline{EN}$ receives a High enable signal, the flip-flop A does not fetch data, even if a clock rises, and it maintains the data fetched immediately before the signal becomes High. An output of the drive diagnostic circuit shown in FIG. 4 is used as the enable signal.

Outputs from the flip-flop A are diagnosed by logic circuits, thereby turning on or off, or blinking a lamp by means of a lamp driver.

Referring to FIG. 4, outputs of the comparators A and B for four wheels are ORed, and a signal J is obtained. When the pulse interval of the signal J is continuous within a predetermined period of time, the drive diagnostic circuit determines that the automobile is running, and outputs a Low signal. When the signal J does not include a pulse, or a pulse interval is wider than the predetermined period of time, the drive diagnostic circuit determines that the automobile is stationary or running at a very low speed, and outputs a High signal. The value of the predetermined period of time is obtained by experiments, such that the circuit may not operate erroneously. In this embodiment, the drive diagnostic circuit is set to output a Low signal, when at least four pulses of the signal J are present in an interval of 0.6 second or shorter.

Figure 8:
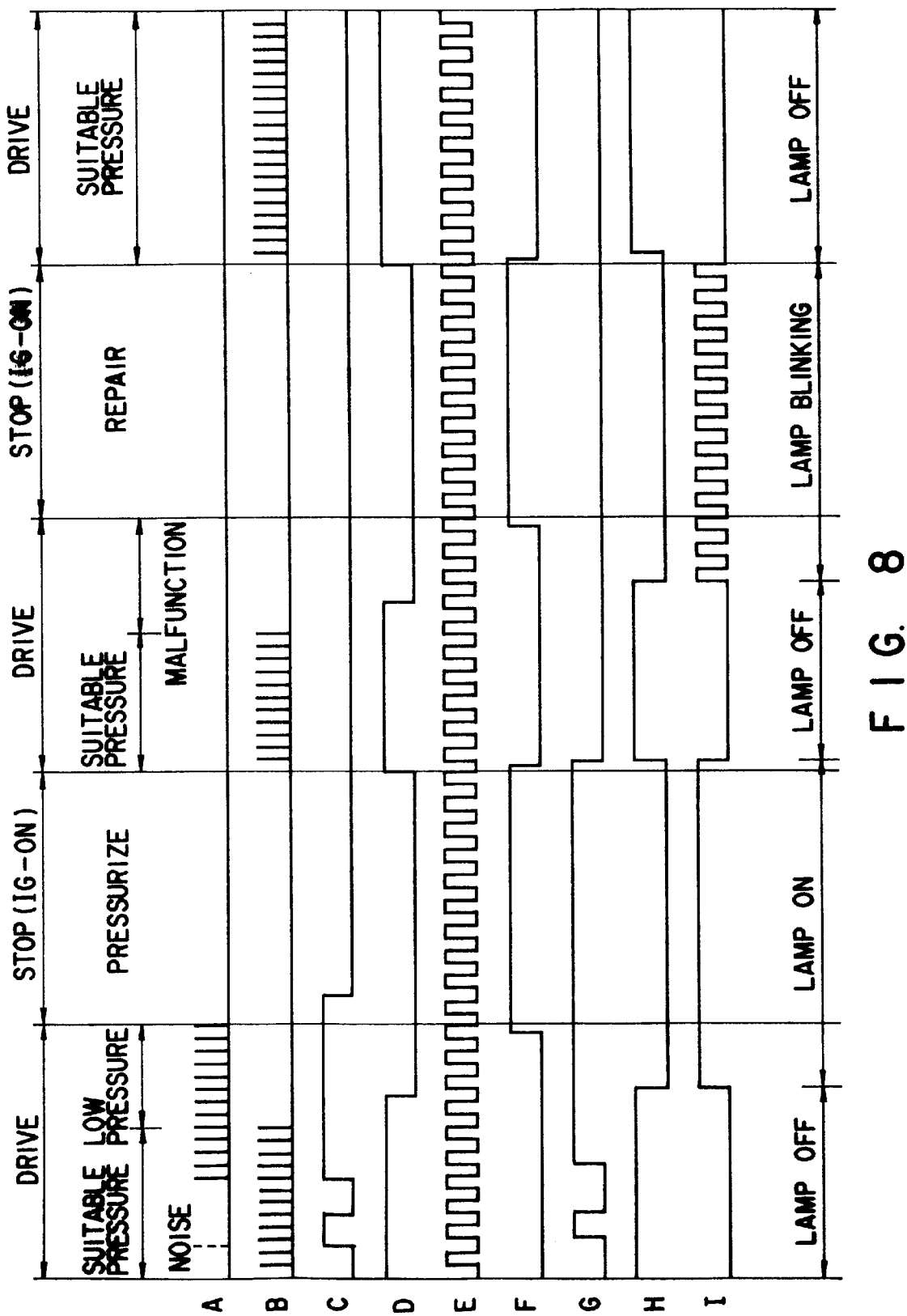
FIG. 8 is a timing chart showing operations of the monitoring circuit.

FIG. 8 is a timing chart showing the overall operation of the above embodiment. In FIG. 8, the symbols A to I represent the following signals:

A: an output of the comparator A (positive)

B: an output of the comparator B (negative)

C: an output of the monostable multivibrator A (positive)

D: an output of the monostable multivibrator B (negative)

E: a clock signal of the flip-flop A, and a blinking signal for lamp driver

F: an enable signal of the flip-flop A (an output of the drive diagnostic circuit)

G: an output of the flip-flop A (positive)

H: an output of the flip-flop A (negative)

I: a lamp driving signal.

When pulses are present in outputs A and B of the comparators A and B, the outputs of the monostable multivibrators A and B are triggered for 2.4 second at the rise of the pulses, and the signals C and D are generated. Since the monostable multivibrators A and B are retriggerable, if the signals A and B are continuous pulses (at intervals of 2.4 or shorter), the signals C and D are kept High.

When the enable signal F is Low, the flip-flop A fetches the signals C and D at a leading edge of the clock signal E, and outputs them as the signals G and H. When the enable signal F is High, even if the clock signal E rises, the flip-flop A does not fetch data but outputs maintained data which has been fetched immediately before the signal F rises to a High level.

The output signal E of the oscillating circuit, used as the clock signal of the flip-flop A, also serves as a blinking signal in case of a malfunction. The signal I for driving the lamp is determined by the signals E, G and H. The relationship between the signal I and the signals E, G and H is represented by the following logical formula:

I=(E NOR G) NOR H.

Figures 9, 10:
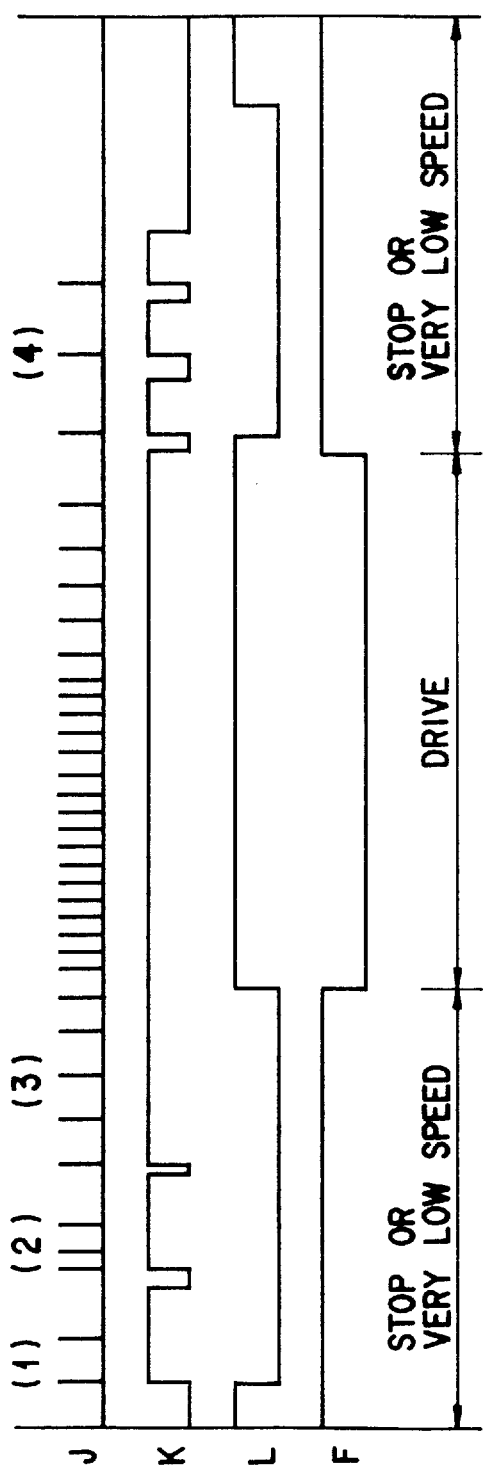
FIG. 9 is a timing chart showing operations of the drive diagnostic circuit.
FIG. 10 is a truth table showing the relationship between the lamp indication and signals G and H.

When the signal I is High, the lamp is on, and when the signal I is Low, the lamp is off. In case of suitable pressure in a tire 3, signals G and H are respectively Low and High or High and High. Therefore signal I is Low. In case of under pressure in a tire 3, signals G and H are respectively High and Low. Therefore signal I is High. Furthermore, in case of a malfunction, signals G and H are respectively Low and Low. Therefore signal I is a blinking signal. Accordingly, the lamp and the signals G and H have the relationship as shown in FIG. 10.

An operation of the drive diagnostic circuit will now be described with reference to the block diagram shown in FIG. 4 and a timing chart shown in FIG. 9. In FIG. 9, the symbols J, K, L and F represent the following signals:

J: OR of outputs of the comparators A and B for four wheels

K: an output Q of the monostable multivibrator C

L: an output $\overline{Q}$ of the monostable multivibrator D

F: an output $\overline{Q}$ of the flip-flop A (the signal L also serves as an input signal and a reset signal for the flip-flop B).

In the drive diagnostic circuit, first, the output signals A and B, from the comparators A and B (shown in FIG. 3) for the four wheels, are ORed, thereby generating a signal J. The signal J is input to the monostable multivibrator C. The signal J is a pulse signal obtained from the four wheels. The monostable multivibrator C outputs a signal K of a predetermined pulse width (0.6 second in this embodiment), at a leading edge of the pulse signal J. The signal K is input to the monostable multivibrator D, which outputs a signal L of a predetermined pulse width (2.0 second in this embodiment), at a leading edge of the signal K. Since the signal L is an output $\overline{Q}$ from the monostable multivibrator D, when it is triggered by the signal K, it becomes Low for a time and then rises to a High level.

At the same time, the signal K is input to the flip-flop B as a reset signal and a data signal. The signal L is input thereto as a clock signal. The flip-flop B, which is basically the same as the flip-flop A, maintains data which has been fetched at a leading edge of the clock signal, and outputs it as the signal F. When the reset signal K becomes Low, the output $\overline{Q}$ of the flip-flop B forcibly becomes High.

Referring to FIG. 9, when two pulses of the signal J are present within the interval of 0.6 second (①), the signal K is triggered at the leading edge of the first pulse and becomes High. Then, since the second pulse rises in 0.6 second again, the signal K becomes Low after 0.6 second from the leading edge of the second pulse.

Similarly, when three pulses of the signal J are present within the interval of 0.6 second (②), the signal K becomes High at the leading edge of the first pulse and Low after 0.6 second from the leading edge of the third pulse.

When four pulses of the signal J are present within the interval of 0.6 second (③), the signal K becomes High at the leading edge of the first pulse and is kept High until the pulse interval exceeds 0.6 second (④).

The signal L becomes Low at the leading edge of the signal K. If the signal K rises again in 2.0 second from the trailing edge of the signal L (② and ③), the signal L becomes High after 2.0 second from the leading edge of the third pulse of the signal K. When the interval of the pulses of the signal J is increased and the signal K rises (④), the signal L becomes Low. Then, the signal L becomes High again after 2.0 second from the trailing edge of the last pulse of the signal K.

The flip-flop B uses the signal K as an input data signal and a reset signal, and the signal L as a clock signal. Therefore, it fetches the data of the signal K at the leading edge of the signal L and outputs it as a signal F. Since the output of the flip-flop B is $\overline{Q}$, it becomes Low if the data of the fetched signal K is High. On the other hand, if the data of the signal K is Low, the flip-flop B is reset and forcibly outputs a High signal. The output signal F of the flip-flop B is used to diagnose the driving state of the automobile. If the output signal F is Low, it is determined that the automobile is running, whereas if the output signal F is High, it is determined that the automobile is stationary or running at a very low speed.

In principle, the signal F becomes Low, when four pulses of the signal J are present within the interval of 0.6 second, and it becomes High, when the interval exceeds 0.6 second.

In this embodiment, when the automobile is running at a speed of 3 to 12 km/h, the signal F becomes Low and it is determined that the automobile is running (depending on the positional relationship among the pressure detectors attached to the four wheels).

The above embodiment has the following advantages.

(1) As shown in FIG. 2, when the piston 33 is moved in the axial direction of the sensor unit 31 by means of the twisted coil spring 39, the rotary shaft 34 is moved backward along the axis thereof. As the rotary shaft is moved backward by means of the threaded portion 36, while the shaft is rotating, the magnet 38 is rotated 180°. More specifically, the N pole and the S pole of the magnet 38 are inverted when the pneumatic pressure in the tire is within the suitable range or lower than the lower limit of the range. Thus, whether the pneumatic pressure in the tire is within the suitable range can be discriminated easily and reliably by detecting, by means of the Hall element 5, whether the N pole and the S pole of the magnet 38 are inverted.

(2) Since the detector of the above embodiment is not of the type which discriminates the pressure based on the distance between the magnet 38 and the Hall element 5, the detection accuracy of the tire pressure detector A is assured in assembling the sensor unit 31 and the Hall element 5. As a result, the manufacturing cost is reduced.

(3) Since the tire pressure detector A does not require correction in accordance with a change in temperature and the structure thereof is simple, it can be produced at a low cost.

(4) In addition to the case in which the reduction of the pneumatic pressure in the tire is detected, if an output of the Hall element 5 is not obtained due to a malfunction of the detector, an lamp of a display unit 41 is blinding, thereby informing the driver of the malfunction. Moreover, without an additional LED for displaying a malfunction, one lamp suffices not only to display whether the tire pressure is suitable or not with ON and OFF (first and second display mode) of the LED and also to display the malfunction with blinking (a third display mode).

(5) While the automobile is stationary with the ignition on, the previous detection state, such as a reduction of the pneumatic pressure or a malfunction, can be maintained.

(6) Since the lamp is turned on in relation to positive and negative pulses of an output from the Hall element 5, a malfunction, such as turning-on of the lamp in case of the normal pressure, can be prevented, even if noise is mixed in the output.

(7) The state of the pneumatic pressure is determined by means of a signal J, obtained by ORing outputs from comparator A, B corresponding to the four wheels, without using an automobile velocity pulse. Therefore, a cable for taking an automobile velocity pulse into a monitoring circuit 40 is not required.

(8) Since data is not picked up from the wheels during low-speed driving, a malfunction due to deviation of pulse timing of the four wheels is prevented, when the automobile is started or immediately before the automobile is stopped.

A second embodiment of the present invention will be described with reference to FIGS. 11 to 14.

FIG. 11 is a block diagram of the monitoring circuit 40 shown in FIG. 1. A drive power source 42 supplies a predetermined voltage to a Hall element 5. The Hall element 5 outputs a voltage corresponding to the direction of a magnetic pole of a magnet 38, which is rotated in accordance with the pneumatic pressure in the tire as described above. Since the output voltage from the Hall element 5 is in the millivolt order, an amplifier 43 amplifies it to a predetermined level. The amplified voltage is output to a sample hold circuit 44 and an edge detector 50.

The edge detector 50 detects a leading edge or trailing edge of an output signal from the amplifier 43, and outputs to a CPU 45 a signal indicating the detection. The signal output from the edge detector 50 is used as a trigger signal for executing a control program to be described later. The sample hold circuit 44 is activated by an activation signal AS supplied from the CPU 45 and holds the output voltage from the amplifier 43.

An A/D converter 46 converts the output voltage held by the sample hold circuit 44 to a digital signal DS, and outputs the digital signal DS to the CPU 45 together with an A/D conversion end signal ES. The CPU 45 executes a control program (to be described later), calculates an approximate value of the pneumatic pressure in the tire (not shown) based on the digital value of the voltage output from the sample hold circuit, and determines a rough state of the pressure from the calculated value. The result of the determination is transmitted to a display unit 41, constituted by 7 segment LEDs or the like. The display unit 41 displays, for example, "suitable pressure", "intermediate pressure" or "under pressure". Details of the operation of the CPU 45 will be described later.

Referring to FIG. 5, the relationship between the rotation angle of the magnet 38 and the output waveform of the Hall element 5. Actually, an output waveform is output from the Hall element, each time the tire makes one rotation. FIG. 5, however, shows only one waveform in order to make the explanation simple. Measurement values indicated below are those obtained under predetermined conditions.

FIG. 12 (a) shows an output waveform of the Hall element 5 in a state where the tire pressure is lowered to about 1.7 Kg/cm$^2$ (beyond the range of the suitable pressure) and the rotation angle of the magnet 38 is 0°, that is, the N pole of the magnet 38 faces the Hall element 5. At this time, in the output waveform of the Hall element 5, the peak value on the positive side is maximum, whereas substantially no peak appears on the negative side. The peak values on the positive and negative sides were measured: 44.5 mV on the positive side and −1.5 mV on the negative side.

Then, the air in the tire is pressurized. When the rotation angle of the magnet 38 is 45°, the output waveform of the Hall element 5 is as shown in FIG. 12 (b). In this state, the peak on the positive side is slightly lower than the maximum on the positive side, whereas a small peak appears on the negative side. The peak values on the positive and negative sides were respectively 39.3 mV and −4.4 mV.

The air in the tire is further pressurized. When the rotation angle of the magnet 38 is 90°, that is, the boundary between the N and S poles faces the Hall element 5, the output waveform of the Hall element 5 is as shown in FIG. 12 (c). In this state, the peaks on the positive and negative sides are substantially the same. The peak values on the positive and negative sides were respectively, 27.1 mV and −14.1 mV.

The air in the tire is further pressurized, and when the rotation angle of the magnet 38 is 135°, the output waveform of the Hall element 5 is as shown in FIG. 12 (d). In this state, the peak on the negative side is greater than that on the positive side. The peak values on the positive and negative sides were respectively, 6.9 mV and −37.8 mV.

Further, when the tire pressure is increased to about 2.0 Kg/cm$^2$ (a suitable pressure), the rotation angle of the magnet 38 is 180°, that is, the S pole of the magnet 38 faces the Hall element 5. At this time, in the output waveform of the Hall element 5, as shown in FIG. 12 (e), substantially no peak appears on the positive side, whereas the peak value on the negative side is maximum. The peak values on the positive and negative sides were measured: 1.1 mV on the positive side and −46.9 mV on the negative side.

Based on the aforementioned relationship between the rotation angle of the magnet 38 and the output waveform of the Hall element 5, the principle for detecting the tire pressure according to the present invention will be described below.

In this embodiment, the ratio of the peak value (absolute value) of the waveform on the positive side to that on the negative side, at each rotation angle (0°, 45°, ... 180°) of the Hall element 5, is first calculated.

Table 1 shows the value of the ratio of the positive peak value to the negative peak value, and the logarithm ($\log_{10}$) thereof.

As shown in Table 1, the ratio of the positive peak value to the negative peak value greatly varies. The difference between the maximum value of the ratio and the minimum value thereof is the greatest when the maximum value is 29.7 (the rotation angle is 0°) and the minimum value is −1.64 (the rotation angle is 180°).

TABLE 1

|  | +/|−| | log10(+/|−|) |
| --- | --- | --- |
| 0° | 29.7 | 1.47 |
| 45° | 8.9 | 0.95 |
| 90° | 1.9 | 0.28 |
| 135° | 0.2 | −0.74 |
| 180° | 0.02 | −1.64 |

The relationship between the logarithm value $\log_{10} x$ (x is the ratio of the positive peak value to the negative peak value) shown in Table 1 and the angle y of the magnet 38 is approximately expressed by, for example, the following equation (1), using the least square method or the like.

$$y32\ 103 - 47.5(\log x) - 8.4(\log x)^2 - 4.9(\log x)^3 \tag{1}$$

The above equation (1) is graphed out as a curve, which is shown in FIG. 13. In the graph, the abscissa represents the logarithm value $\log_{10} x$, while the ordinate represents the angle y of the magnet 38.

Using the above equation (1), the angle of the magnet 38 can be obtained from the ratio x of the positive peak value to the negative peak value.

Assume that the relationship between the angle y of the magnet 38 and the pneumatic pressure z in the tire is given as a linear function and expressed by the following equation (2), where, when y=0(°), z=1.7 (kg/cm$^2$), and when y=180 (°), z=2.0 (kg/cm$^2$).

$$z = (1/600)y + 1.7 \tag{2}$$

The relationship between the ratio x of the positive peak value to the negative peak value and the pneumatic pressure z in the tire is given by the following equation (3) which is obtained from the above equations (1) and (2).

$$z=1.87-7.9\times10^{-2}(\log x)-1.4\times10^{-2}(\log x)^2-8.2\times10^{-3}(\log x)^3 \quad (3)$$

As described above, it is possible to calculate an approximate value of the tire pressure from the output of the Hall element 5. Based on the calculated value, the state of the tire pressure (suitable pressure, intermediate pressure or under pressure) can be accurately detected.

Figure 14:
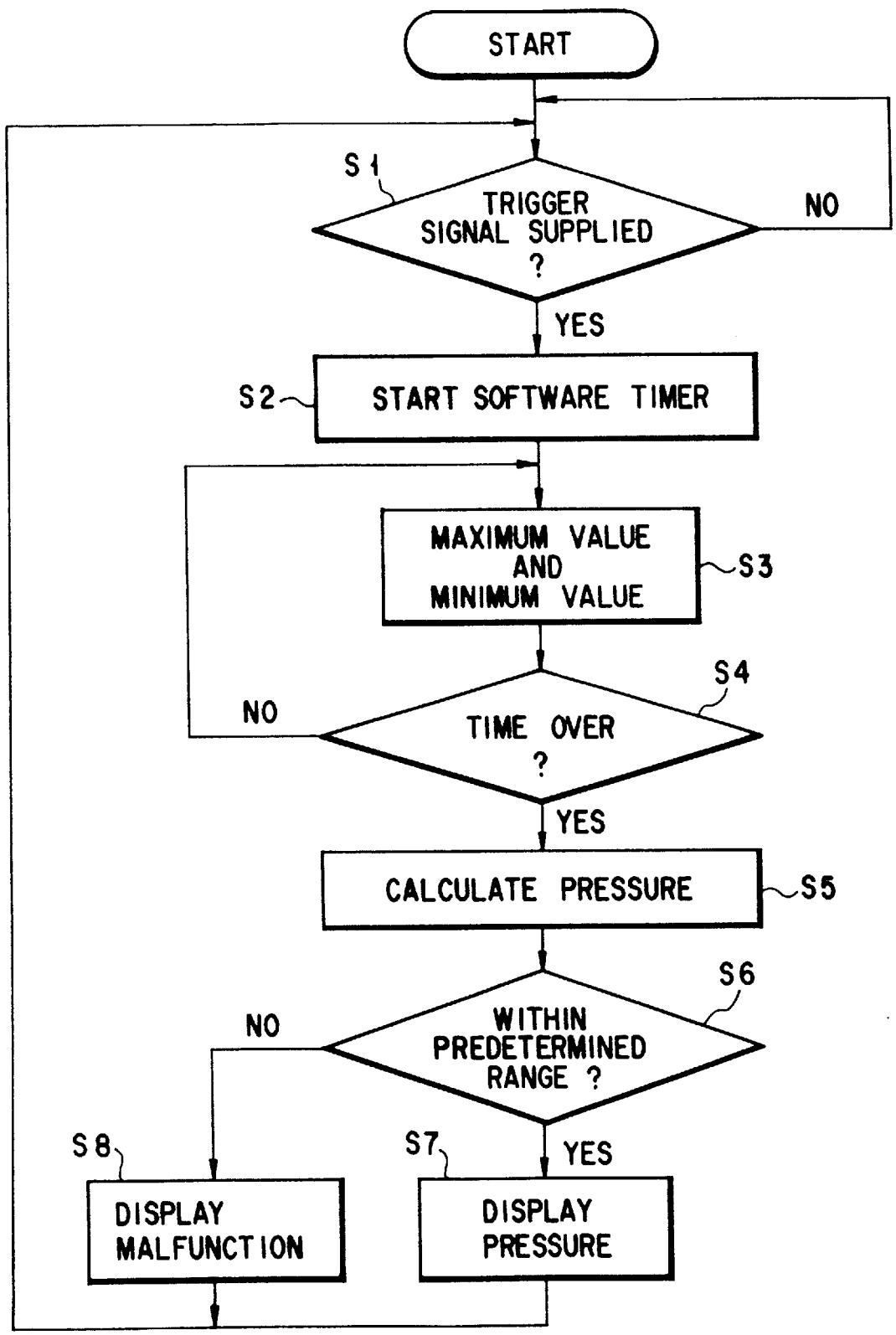
FIG. 14 is a flowchart for explaining the operations of the present invention.

An operation of the tire pressure detector according to this embodiment will be described with reference to FIG. 14. FIG. 14 is a flowchart showing a control program executed by the CPU 45. In the following explanation, it is assumed that the automobile is running.

When power is supplied to the tire pressure detector, the CPU 45 executes a process of a step S1. In the step S1, it is determined whether a trigger signal is supplied from the edge detector 50. If a trigger signal is not supplied, the step S1 is executed again. If a trigger signal is supplied, a step S2 is executed, that is, a software timer is started.

In a step S3, the CPU obtains maximum and minimum values of outputs of the Hall element 5, which are sequentially supplied from the A/D converter 46. In a step S4, the CPU determines whether a predetermined period of time, set to the software timer, has elapsed. If not, the flow returns to the step S3. In other words, the process of the step S3 is repeated, while the result of the step S4 is "No".

The predetermined period of time set in the software timer is determined depending on a detectable speed of the automobile. For example, when the speed is 6 km/h or higher, the time required for the tire to make one rotation is about 1.2 second. Therefore, if a longer time, e.g., 1.5 second, is set to the software timer, at least one output of the Hall element can be detected within the set time. In this case, the peak values on the positive and negative sides of the output waveform of the Hall element 5 can be obtained, before the result of the step S4 becomes "Yes".

When the result of the step S4 is "Yes", the flow advances to a step S5. In the step S5, the ratio of the positive peak value to the negative peak value, obtained in the step S1, is calculated. The calculated value is substituted for x in the above equation (3), thereby obtaining an approximate value of the tire pressure.

In a step S6, the CPU determines whether the tire pressure is within a predetermined range. If it is considered that a normal detection is not performed, for example, if the tire pressure has a negative value, the CPU determine that the tire pressure detector has a malfunction.

If the calculated value obtained in the step S5 is within the predetermined range, it is considered that the tire pressure detector does not have a malfunction. Then, it is determined in which one of the following states the tire pressure is classified:

under pressure: about 1.7 kg/cm$^2$
intermediate pressure: about 1.85 kg/cm$^2$
suitable pressure: about 2.0 kg/cm$^2$.

The result of the determination is supplied to the display unit 41 in a step S7. The display unit 41 displays the range of the current tire pressure ("suitable pressure", "intermediate pressure" or "under pressure").

If the calculated value obtained in the step S5 is not within the predetermined range, since it is considered that the tire pressure detector has a malfunction, the result of the determination in the step S6 is "No". Then, the flow advances to a step S8, in which the CPU 45 transmits information representing a malfunction to the display unit 41. Accordingly, the display unit 41 displays a malfunction.

As described above, according to the present invention, the magnet 38 is rotated in accordance with the pneumatic pressure in the tire, so that the direction of the N or S pole of the magnet with respect to the Hall element 5 is changed. In accordance with the change of the direction of the magnet, the ratio of the positive peak value to the negative peak value of an output voltage supplied from the Hall element 5 is changed. The tire pressure is calculated on the basis of the value of the ratio.

Therefore, even if the peak value of an output voltage from the Hall element 5 is changed by external factors, such as environmental conditions (e.g., a change in temperature) or positional deviation due to low accuracy of attaching the sensor unit or the Hall element, the value of the pneumatic pressure obtained by the calculation will be influenced little by the peak value itself, because it is calculated on the basis of the ratio of the positive peak value to the negative peak value of an output voltage from the Hall element 5, which is changed in accordance with the direction of the magnet 38. As a result, accuracy of detecting the tire pressure is increased. In addition, since a structure for temperature compensation is not required, the manufacturing cost is lowered.

Although in the case of one wheel has been described above, if the automobile has a plurality of wheels, it is only necessary that the same tire pressure detector be provided for each tire.

In the above embodiment, the magnet 38 is rotated 180° in the tire pressure ranging from 1.7 kg/cm$^2$ to 2.0 Kg/cm$^2$. However, the present invention is not limited to this embodiment. To increase the range of the tire pressure which can be detected, it is possible to set the magnet 38 so as to be rotated 180° in a wider range of the tire pressure.

Further, in the above embodiment, the range of the tire pressure (under pressure, intermediate pressure or suitable pressure) is displayed. However, the value of the tire pressure itself can be displayed in digital style.

As has been described above, even if the peak value of an output voltage from the detecting means is changed by environmental conditions, such as a change in temperature, or positional deviation due to low accuracy of attaching the sensor unit or the Hall element, the influence on the detection result is suppressed, so that the accuracy of detecting the tire pressure is increased. In addition, since a structure for temperature compensation is not required, the manufacturing cost is lowered.

What is claimed is:

1. A tire pressure detector of an automobile, comprising:

a magnet having N and S poles and rotated by a pneumatic pressure in a tire to revolve the N and S poles;

detecting means, arranged opposite to the magnet, for detecting magnetism and outputting a voltage signal changed to different magnetism level in accordance with rotation of the magnet; and determining means for comparing the voltage signal with a positive or negative threshold value and determining whether the pneumatic pressure in the tire is within a suitable range, based on a polarity of the voltage signal represented by a comparison result.

2. A tire pressure detector of an automobile, comprising:

a magnet having N and S poles and rotated by a pneumatic pressure in a tire to revolve the N and S poles;

detecting means, arranged opposite to the magnet, for detecting magnetism and outputting a voltage signal at the N and S poles on a level corresponding to a rotation angle of the magnet; and calculating means for calculating the pneumatic pressure in the tire based on a ratio of a positive peak value to a negative peak value of the voltage signal.

3. The tire pressure detector according to claim 2, further comprising determining means for determining accurately an inner pressure of the tire on the basis of a result of a calculation performed by the calculation means.

4. The tire pressure detector according to claim 1, further comprising a second determining means which determines when the detector is out of order when the voltage signal does not represent a positive polarity or a negative polarity.

* * * * *